July 10, 1951     J. BOUCHER     2,559,846
CONCRETE PIPE MOLD
Filed April 5, 1948
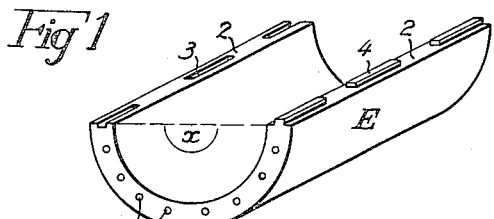
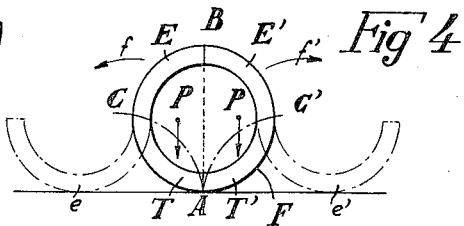
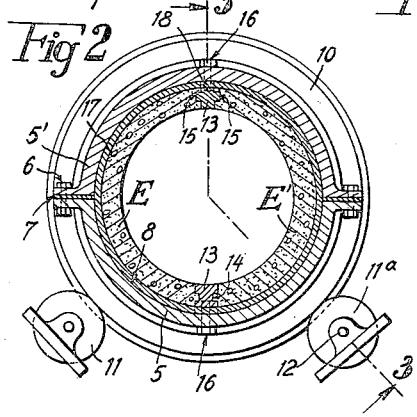
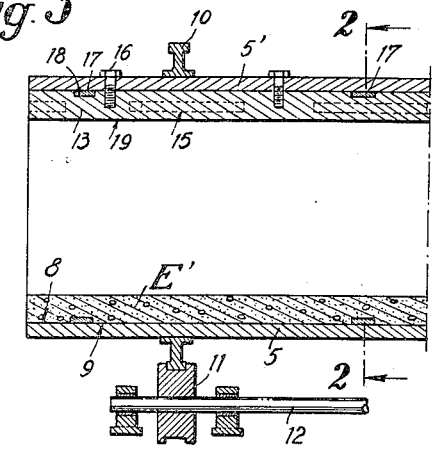
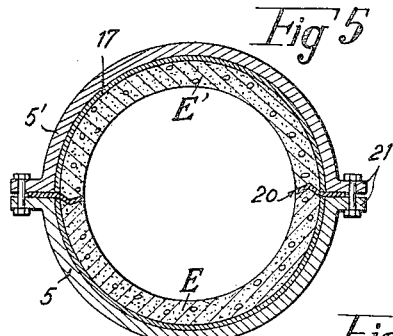
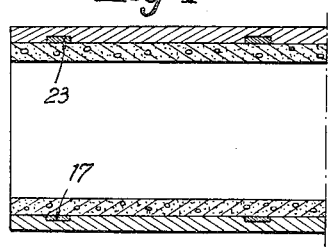
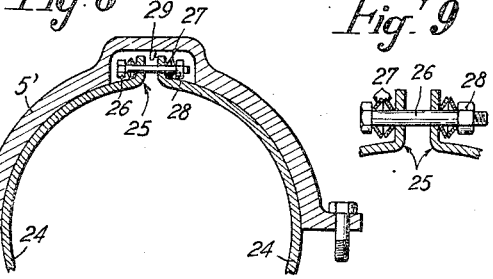
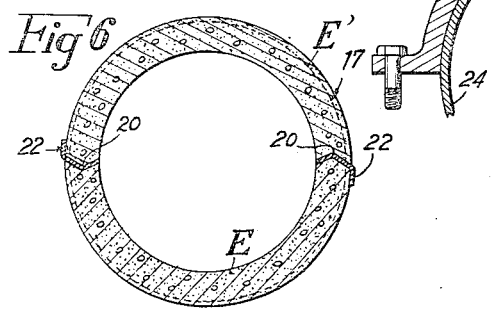
Jacques Boucher
INVENTOR
By Richardson, David and Mason
his ATT'YS Patented July 10, 1951

2,559,846

UNITED STATES PATENT OFFICE 2,559,846

CONCRETE PIPE MOLD

Jacques Boucher, Paris, France, assignor to Compagnie de Pont-a-Mousson, Nancy, France, a French company Application April 5, 1948, Serial No. 19,034
In France April 11, 1947

6 Claims. (Cl. 25—127)

The invention has for its object to provide means for the manufacture of concrete pipe.

Other features of the invention will become apparent from the following description.

In the accompanying drawing which is given solely by way of example:

Fig. 1 is a plan view of a conduit member according to the invention;

Fig. 2 is a transverse sectional view along to the line 2—2 of the Fig. 3 of the assembled mold of a centrifugal casting machine, and of two conduit members cast in said mold;

Fig. 3 is a longitudinal sectional view of the mold along the line 3—3 of Fig. 2;

Fig. 4 relates to a method of separating two semi-cylindrical members;

Fig. 5 is a transversal section corresponding to Fig. 2, showing a modification of the longitudinal separators of the members before stripping;

Fig. 6 is a corresponding section of the same separators after stripping;

Fig. 7 is a view in diametrical section of a mold and the cast members, said figure showing another form of a collar for temporary coupling said cast members;

Fig. 8 is a view of a portion of the cross section of another embodiment of the coupling collar;

Fig. 9 is, on a larger scale, a view of a portion of a resilient device for collar clamping.

According to the example shown in Fig. 1, the member E of an open channel or conduit, according to the invention is cylindrical and has a circular cross-section, the inner and outer outlines of which are formed by concentric portions of circumferences. The angle at the centre $x$ of each of said portions is substantially a sub-multiple of 360°, so that a cylinder of circular cross-section may be made by uniting a certain number of such members by their longitudinal radial faces 2.

By way of example, the angle $x$ has been chosen equal to 180°, and in this case the cylinder is made up of two members.

The member E is provided with two longitudinal reinforcements to give it a greater rigidness.

The longitudinal radial faces 2 are provided with mortises 3 or tenons 4 which form lengthwise and crosswise recessed or raised bearing surfaces with respect to said flat radial faces.

Figs. 2 and 3 show a device for the manufacture of members E and E' of the above type. This device includes a mold composed, as well known, of two parts 5 and 5' the inner and outer surfaces of which are cylindrical and coaxial while their cross-section is semi-circular. Said parts are provided with tightening joints 7 and joined outwardly by bolts 6. The inner face 8 of the mold corresponds to the outer surface 9 of the members to be cast therein.

This mold rests, through the medium of two roller-rings 10, on two pairs of rollers 11, 11a; two of said rollers (11a for example) are keyed on a driving shaft 12.

The mold is internally provided with two longitudinal separators 13. These separators, preferably metallic, have mortises 14 and/or tenons 15 on their longitudinal side faces. They are fixed on the inner wall of the mold by means of screws 16; said screws are operable from outside.

On the inner face 8 of the mold, monobloc metallic collars 17 are arranged, said collars are imbedded in notches of the longitudinal separators 13. The outer diameter of said collars is equal to the inner diameter of the mold.

The device operates as follows:

The mold (5a, 5b) assembled and provided with separators 13 is placed on rollers 11, 11a of the casting machine. The centrifugal casting of concrete is carried out according to the known process of general use to manufacture ordinary concrete pipes.

Separators 13, the height of which is equal to the thickness of the cast material, separates it into two semi-cylindrical members E and E'. The inner surface 19 of these separators flush with the inner surface of said members.

When the concrete has reached a sufficient resistance, the stripping is carried out.

Collars 17 remain imbedded in the cement cylinder thus composed and hold members E and E' and separators 13 as a complete cylinder thus facilitating their handling and transport to the place of use.

Separate handling of such element, especially sensitive to shocks and cross buckling, would necessitate special hoisting and transport apparatus such as cranes, gantries, crabs, etc., and great precautions to avoid breakage and damage.

On the contrary, a complete rigid cylinder offers a much greater resistance to the cross bending, the hoisting material is greatly simplified, and finally in movements on the level, it is able to roll along on itself, thus avoiding the use of a hoisting apparatus.

The assembly of two members E and E' composing the cylinder is perfect. Indeed by the centrifugal casting the concrete is molded in mortises 14 and on tenons 15 of separators 13 and the resulting tailing-in of members E and E' in said separators stops all end and cross relative play of said two members.

On the place of use, it only needs severing collars 17 to separate members E and E'.

When the cylinder is composed of two semi-cylindrical members, collars 17 are severed or opened, the plane of joint AB of the two members being vertical (Fig. 4). Members E and E' are then drawn by their own weight in the direction of arrows f and f' on both sides of the assembling plane AB and roll on their outer faces while separating one from the other until in their stable positions e and e' shown by dotted lines.

Their lower sections T and T' describe two cycloid elements C and C', out of A, whence they are tangent and do not meet; the rotation of the two semi-cylindrical members E and E' is therefore never impeded. This enables avoiding the use of a hoisting apparatus to raise the upper member and to turn it so as to put it in its workable position, which would be necessary if the joint plane AB was horizontal.

With said opening process, the stable position of members E, E' corresponds precisely to their workable direction.

According to the embodiment shown in Fig. 5, the separators are composed of thin fluted metal plates 20; these plates are gripped between clamps 21 of the mold parts 5, 5' and tightened with said clamps when the mold is assembled. After stripping, the metal band parts, which are external to members E and E', are turned down against the wall of one or other of these members at 22 (Fig. 6), so as not to hinder the rolling.

According to another embodiment shown in Fig. 7, collars 17 are imbedded in recesses 23 of the mold, their inner diameter is then equal to the inner diameter of said mold and it is no longer necessary to hollow out the longitudinal separation bands 13, as seen at 18 in Fig. 3. In this case, after stripping collars 17 are offset with respect to the external surface of the cylinder formed by conduit members E, E' and bands 13.

In one or the other case, recesses 23 of the mold or grooves 18 (Figs. 2, 3) of the separation bands stop all end play of collars 17.

According to the embodiment shown in Fig. 8, the collars are composed of two parts 24 of semi-circumferential shape bent at right angles at 25, at both ends (Figs. 8, 9) and assembled by means of bolts 26. Resilient washers 27, in opposition to their bases, are placed between the tightening bolt 26 or its nut 28 and the ends 25 to make for the half-collars a resilient coupling which enables a variation of the circumferential length of the complete collar. Ends 25, bolts 26, nuts 28 and washers 27 imbed in recesses 29 of the mold (5, 5') and are sunk in plastic material, not shown, completely filling said recesses, and, on centrifugation, avoiding a flow of concrete which, after hardening, would block up the resilient coupling. Said plastic material is easily withdrawn after stripping and enables to make completely free the tightening device of the half-collars.

On stripping, nuts 28 are tightened, thus causing half-collars 24 to bear strongly on the wall of members E, E'. The resilient pressure due to washers 27 enables the half-collars to follow the small circumferential variations of the cylinder due to the contraction of the concrete during its maturing and ensures a permanent contact of the collar on members E, E'.

Obviously the invention is not limited to the embodiments shown and described, which have been given only by way of example.

Thus the concrete cylinder can be composed of more than two cylindrical sectors whose angle at the centre is a corresponding sub-multiple of 360°.

A quite different cross-section can be given to separators 13, in order to stop all end or cross play of the members in relation to the separators, and as a result the members between themselves. The lateral longitudinal faces of said separators can be grooved, corrugated, fluted, etc.

Instead of sinking the coupling device of half-collars 24 (Fig. 8) in plastic material, quite different means can be used to tighten the joint between the housing 29 of the mold and the formed collar.

The manufacturing and transport process may likewise apply to all sorts of symmetrical or asymmetrical concrete members but whose assembling makes a solid which can be obtained by centrifugal casting.

Having now described my invention what I claim as new and desire to secure by Letters Patent is:

1. A cylindrical mold for casting simultaneously by centrifugation several cylindrical conduit members which have a cross-section, the inner and outer outlines of which are formed by concentric portions of circumferences each having an angle at the centre substantially equal to a sub-multiple of 360°, said mold comprising in combination at least two cylindrical mold parts having annular semi-circular cross-sections and longitudinal radial faces, mechanical external means for joining said parts at said longitudinal radial faces, removable longitudinal separation elements secured to said mold parts and protruding inwardly and radially with respect thereto, the angle at the centre between both adjacent radial longitudinal faces of two successive elements being equal to said sub-multiple, and at least one transversal circular collar housed in said mold and passing between said mold parts and said separation elements.

2. A cylindrical mold as claimed in claim 1 wherein said longitudinal separation elements are formed by bars of substantially rectangular cross-section secured to the inner wall of said mold parts and provided with recesses and protuberances on said longitudinal radial faces, said recesses and protuberances having complementary shapes, said collar being embedded in notches provided into the peripheral longitudinal faces of said separation elements and the outer diameter of said collars being equal to the inner diameter of said mold parts.

3. A cylindrical mold as claimed in claim 1 wherein said longitudinal separation elements are formed by bars of substantially rectangular cross-section secured to the inner wall of said mold parts and provided with recesses and protuberances on said longitdinal radial faces, said recesses and protuberances having complementary shapes, said collar being embedded in a groove of said mold parts and the inner diameter of said collar being equal to the inner diameter of said parts.

4. A cylindrical mold as claimed in claim 1 wherein said separation elements are composed of metal plates partially gripped between the mold parts and protruding radially from the inner wall of said parts.

5. A cylindrical mold as claimed in claim 1 wherein said collar is endless.

6. A cylindrical mold as claimed in claim 1 wherein said collar comprises at least two parts, each bent outwardly at both ends, bolts and nuts for joining the adjacent bent ends of said parts, resilient washers around said bolts between said ends and said nuts or the heads of said bolts, said ends, bolts, nuts and washers being imbedded in recesses provided in the inner wall of said mold parts.

JACQUES BOUCHER.

REFERENCES CITED

The following references are of record in the file of this patent:

UNITED STATES PATENTS

| Number | Name | Date |
|---|---|---|
| 442,162 | Young | Dec. 9, 1890 |
| 614,549 | Hoff | Nov. 22, 1898 |
| 1,197,966 | Sweney | Sept. 12, 1916 |
| 1,499,954 | Stiles | July 1, 1924 |
| 1,683,544 | Hansen | Sept. 4, 1928 |
| 1,823,819 | Crompton | Sept. 15, 1931 |